United States Patent [19]
Onopchenko et al.

[11] 3,725,471
[45] Apr. 3, 1973

[54] PROCESS FOR PREPARING HYDROXYBENZOIC ACID

[75] Inventors: Anatoli Onopchenko, Monroeville; Johann G. D. Schulz, Pittsburgh; Richard Seekircher, Cheswick, all of Pa.

[73] Assignee: Gulf Research & Development Company, Pittsburgh, Pa.

[22] Filed: Apr. 27, 1970

[21] Appl. No.: 32,336

[52] U.S. Cl. ..........................260/521 R, 260/524 R
[51] Int. Cl..............................................C07c 65/02
[58] Field of Search............260/524 R, 612 C, 521 R

[56] References Cited

UNITED STATES PATENTS

| | | | |
|---|---|---|---|
| 2,302,462 | 11/1942 | Palmer et al. | 260/524 |
| 2,245,528 | 6/1941 | Loder | 260/524 |
| 2,628,983 | 2/1953 | Aller et al. | 260/621 |

Primary Examiner—Lorraine A. Weinberger
Assistant Examiner—R. S. Weissberg
Attorney—Meyer Neishloss, Deane E. Keith and Joseph J. Carducci

[57] ABSTRACT

A process for converting a benzenoid structure carrying a nuclear methyl substituent and a higher alkyl substituent to a hydroxybenzoic acid which involves heating the benzenoid structure with oxygen in the presence of cobaltic ions dissolved in a lower carboxylic acid solvent to selectively convert the methyl substituent on the benzenoid compound to a carboxylic acid group, heating the total reaction product containing the benzenoid compound in a basic system with molecular oxygen to convert the higher alkyl substituent to the corresponding hydroperoxide substituent and thereafter decomposing the benzenoid hydroperoxide compound to hydroxybenzoic acid and ketone.

12 Claims, No Drawings

PROCESS FOR PREPARING HYDROXYBENZOIC ACID

This invention relates to a process for converting a benzenoid structure carrying a methyl substituent and a higher alkyl substituent to a hydroxybenzoic acid.

The benzenoid structure that is subjected to oxidation herein can be defined as one having an aromatic nucleus carrying as nuclear substituents thereon a methyl group and a higher alkyl group having from two to 10 carbon atoms, preferably from two to four carbon atoms. The higher alkyl substituent is one wherein the carbon attached to the benzenoid structure carries secondary or tertiary hydrogens. Examples of such compounds are ortho-ethyl-toluene, ortho-propyl-toluene, ortho-isopropyltoluene, ortho-butyl-toluene, ortho-isobutyltoluene, ortho-sec-butyltoluene, 2-(1-meth-yloctyl)toluene, 2-(2,2-dimethylheptyl)toluene, 2-(1-methylnonyl)-toluene, 2-(2,2-dimethyloc-tyl)toluene, meta-ethyltoluene, meta-propyltoluene, meta-isopropyltoluene, meta-butyltoluene, meta-isobutyltoluene, meta-sec-butyltoluene, 3-(1-methyloc-tyl)toluene, 3-(2,2-dimethylheptyl)toluene, 3-(1-methylnonyl)toluene, 3-(2,2-di-methyloctyl)toluene, para-ethyltoluene, para-propyltoluene, para-isopropyl-toluene(para-cymene), para-butyltoluene, para-isobu-tyl-toluene, para-sec-butyltoluene, 4-(1-methyloc-tyl)toluene, 4-(2,2-dimethylheptyl)toluene, 4-(1-methylnonyl)toluene, 4-(2,2-dimethyl-octyl)toluene, etc. Of these para-cymene as the charge is preferred to obtain para-hydroxybenzoic acid and acetone.

The first step involved herein involves subjecting the benzenoid structure defined herein to oxidation so that substantially only the methyl substituent is converted and that such conversion be to the carboxylic acid substituent. This is done in accordance with the procedure defined and claimed in our copending application, Ser. No. 32,335, filed concurrently herewith, assigned to the same assignee as the present invention. Stated briefly, such procedure involves heating the defined benzenoid structure with molecular oxygen in the presence of cobaltic ions in a lower carboxylic acid solvent.

The amount of oxygen used is at least that amount stoichiometrically required to convert the methyl substituent on the benzenoid compound to the carboxylic acid group. Complete utilization of oxygen may not occur in all cases, but it is possible to use amounts in excess of those stoichiometrically required, for example, from about 1.5 to about 20 molar excess.

Cobalt can be used in the form of any of its compounds, preferably as a salt, soluble in the reaction mixture. Thus, the cobalt compound can be in the form of an inorganic compound or as an organic compound, for example, as a cobaltous or cobaltic chloride, sulfate, nitrate, acetate, propionate, butyrate, isovalerate, benzoate, toluate, naphthenate, salicylate, acetyl acetonate, etc. Of these cobaltous or cobaltic acetate is preferred. The amount of cobalt compound, as cobalt, employed must be at least about 0.1 percent by weight, based on the reaction medium or solvent, defined hereinafter, preferably from about 1 to about 5 percent by weight.

The reaction medium or solvent is a lower carboxylic acid having from two to 16 carbon atoms, preferably two to six carbon atoms, such as acetic acid, propionic acid, n-butyric acid, n-va-leric acid, n-caproic acid, n-heptoic acid, n-caprylic acid, n-nonanoic acid, n-decanoic acid, n-undecanoic acid, n-dodecanoic acid, n-tridecanoic acid, n-tetradecanoic acid, n-pentadecanoic acid, n-hexadecanoic acid, etc. The amount of reaction medium used is at least that amount sufficient to render the reaction mixture into a substantially homogeneous liquid phase. Thus, the weight ratio of reaction medium to benzenoid compound can be from about 100:1 to about 1:1, preferably from about 15:1 to about 4:1.

As to reaction conditions, the temperature can be from about 50° to about 200° C., preferably from about 85° to about 135° C. Pressure does not affect the course of the reaction and the only consideration thereof resides in employing sufficient pressure to maintain the desired liquid phase. A pressure of about 50 to about 1,000 pounds per square inch gauge, preferably about 100 to about 400 pounds per square inch gauge, is sufficient. Reaction time is dependent upon the amount of conversion desired and generally the reaction is then terminated. Thus, a reaction time of about 1 minute to about 20 hours, preferably about 10 minutes to about 5 hours, can be used.

The initial oxidation must be carried out in the presence of cobaltic ions. In the event cobaltous ions are in the reaction solution, it is necessary to convert the same to their cobaltic form. This can be done, for example, by having in the reaction mixture a free radical initiator, such as a methylenic ketone. Examples of the same that can be used are methyl ethyl ketone, methyl propyl ketone, diethyl ketone, cyclopentanone, cyclohexanone, cycloheptanonone, cyclooctanone, 1-tetralone, 2-tetralone, etc. Of these methyl ethyl ketone is prferred, which can be added as such or can be made in situ from butane as the reaction proceeds. When an initiator is used it can be present in an amount of about 0.1 to about 100 percent by weight, preferably from about 1 to about 5 percent by weight, based upon the reaction medium.

The reaction of this invention can be carried out in any suitable manner, batch or continuous, as long as intimate contact is maintained among the various coponents of the reaction system. Thus, in a batch system, the reaction medium, for example, acetic acid, para-cymene and cobaltic acetate, are placed in a closed reactor and the same is pressured to reaction pressure with oxygen. The mixture is then raised to reaction temperature while stirring. Additional oxygen is introduced into the reaction system to compensate for the oxygen taken up by the reaction. Reaction can be discontinued at any time but preferably when further oxygen absorption ceases. In a continuous reaction, for example, the acetic acid, para-cymene, cobaltic acetate and oxygen are passed upwardly through a reactor containing a sparger or an inert packing, such as Raschig rings or Berl saddles, maintained at suitable temperature and pressure to obtain the desired conversion. The reaction product is removed continuously overhead.

The product obtained contains the desired alkylbenzoic acids and a substantial amount of an alkoylbenzoic acid. This means, for example, when para-cymene is oxidized the reaction product will contain para-isopropylbenzoic acid and para-aceto-benzoic acid. Depending upon the charge employed and the oxidation conditions used the amount of alkoylbenzoic acid produced can be from about 0.1 to about 30 percent by weight, but generally will be about 5 to about 20 percent by weight, based on the alkyl-benzoic acids produced.

In producing the hydroxybenzoic acids in accordance with the procedure defined and claimed herein the total reaction product defined above is subjected to oxidation to convert the remaining alkyl substituent on the alkylbenzoic acid to the corresponding hydroperoxide, and the latter is then decomposed to convert said hydroperoxide to hydroxybenzoic acid and ketone. Each of these steps can be effected in a simple manner.

The conversion of the alkylbenzoic acid to the corresponding hydroperoxide is obtained by contacting the mixture containing the same and the alkoylbenzoic acid with molecular oxygen. During the oxidation stage the alkoylbenzoic acid remains substantially unaffected. The temperature of the oxidation can be from about 50° to about 140° C., preferably about 75° to about 120° C., the pressure about atmospheric to about 100 pounds per square inch gauge, preferably about atmospheric to about 20 pounds per square inch gauge, and the reaction time about 1 to about 60 hours, preferably about 10 to about 30 hours. A stoichiometric amount of oxygen is required, but it is possible to use, for example, about 1 to about 100 molar excess. In order to prevent premature decomposition of hydroperoxides to phenolic products, which would inhibit further oxidation, the system is maintained neutral or alkaline. To this end a basic reagent is also introduced into the reaction system to maintain the system in the pH range of 7 to about 12, preferably about 7.5 to about 10.5, during the oxidation stage. Any basic reagent effective to maintain the desired pH range and which will not adversely affect the course of the reaction can be used. Of these the hydroxides or salts of alkali metals or alkaline earth metals are preferred. Examples of such basic reagents are sodium hydroxide, ammonium hydroxide, potassium hydroxide, lithium hydroxide, magnesium hydroxide, calcium hydroxide, sodium carbonate, potassium carbonate, magnesium oxide, calcium oxide, etc.

Although not necessary, a small amount of a free-radical agent can be used to initiate the reaction. For such purpose any free-radical agent can be used, for example, peroxides, such as tertiary butyl peroxide, cumene hydroperoxide, lauroyl peroxide, benzoyl peroxide, di-tert-butyl peroxide, acetyl peroxide, methyl ethyl ketone peroxide, cyclohexanone peroxide, etc., ultraviolet radiation, etc. When used they can be present in an amount corresponding to about 0.001 to about 1 percent by weight, preferably about 0.01 to about 0.1 percent by weight, based on the alkylbenzoic acid. If desired, the oxidation can be carried out in a solvent medium inert under the oxidation conditions defined herein. For example, solvents, such as methyl ethyl ketone, acetone, aliphatic and aromatic hydrocarbons, etc. can be used. Although the oxidation defined above has been described in reference to the oxidation of the alkylbenzoic acid it is understood that the oxidation applies equally well to the esters or salts thereof. The esters or salts can be obtained, for example, by reaction with alcohols, such as methyl alcohol, ethyl alcohol, propyl alcohol, etc., or with basic reagents, such as sodium hydroxide, potassium hydroxide, ammonium hydroxide, etc. using conventional means.

The total oxidation product obtained is then subjected to conditions that will decompose the hydroperoxide obtained in the previous step to the desired hydroxybenzoic acid. At the same time, a ketone and para-acetobenzoic acid are also formed. Thus, in the present process when para-cymene is employed as charge, the first stage oxidation results in the production of para-iso-propylbenzoic acid and para-acetobenzoic acid; the second stage oxidation of the total product results in the production of para-isopropylbenzoic acid hydroperoxide, the para-acetobenzoic acid remaining unaffected; and the decomposition of the product from the second stage results in the production of para-hydroxybenzoic acid, acetone and additional para-acetobenzoic acid.

Preferably, the decomposition defined above is carried out by heating the reaction product from the second stage of the process at a temperature of about 20° to 100° C., preferably about 60° to about 75° C., and atmospheric pressure for about 1 minute to about 5 hours, preferably about 15 minutes to about 1 hour, with about 1 to about 50 percent by weight, preferably about 2 to about 30 percent by weight, based upon the reaction mixture, of a strongly acidic material, such as sulfuric acid, hydrochloric acid, phosphoric acid, etc.

The recovery of the desired hydroxybenzoic acid from the final mixture can be effected in any desirable manner. Thus, the final mixture can be added to water which is at an elevated temperature of about 50° to about 125° C., resulting in the formation of an oily layer and an aqueous layer, which can be separated from each other in any convenient manner, for example, by decantation. The oily layer contains unreacted alkylbenzoic acid, some alkoylbenzoic acid and some alpha hydroxy-para-isopropylbenzoic acid. The aqueous layer is then cooled to a temperature of about 0° to 20° C., whereby the desired hydroxybenzoic acid comes out of solution. Simple filtration is sufficient to recover the hydroxybenzoic acid, which can be further purified by crystallization. The separation of ketone and alkoylbenzoic acid from the filtrate can be carried out in any effective manner, for example, by distillation at a temperature of about 30° to about 200° C.

The results obtained herein are unexpected. As pointed out above the product obtained at the end of the first stage, that is, the product obtained in our said copending application, Ser. No. 32,335, filed concurrently herewith, contains not only the desired alkylbenzoic acid but also an alkoylbenzoic acid. For purposes of explanation herein, consider the oxidation of para-cymene to para-isopropylbenzoic acid and para-acetobenzoic acid. It would be expected that to convert the para-isopropylbenzoic acid to the corresponding hydroperoxide, it is necessary, and critical, to remove the para-acetobenzoic acid therefrom, since the oxidation must be caried out in a basic solution. On prolonged heating, compounds carrying a carbonyl function are known to undergo an Aldol-type condensation to form ketols and their dehydration products, for example, unsaturated ketones. This can be explained from the following series of equations, R being a carboxyl group:

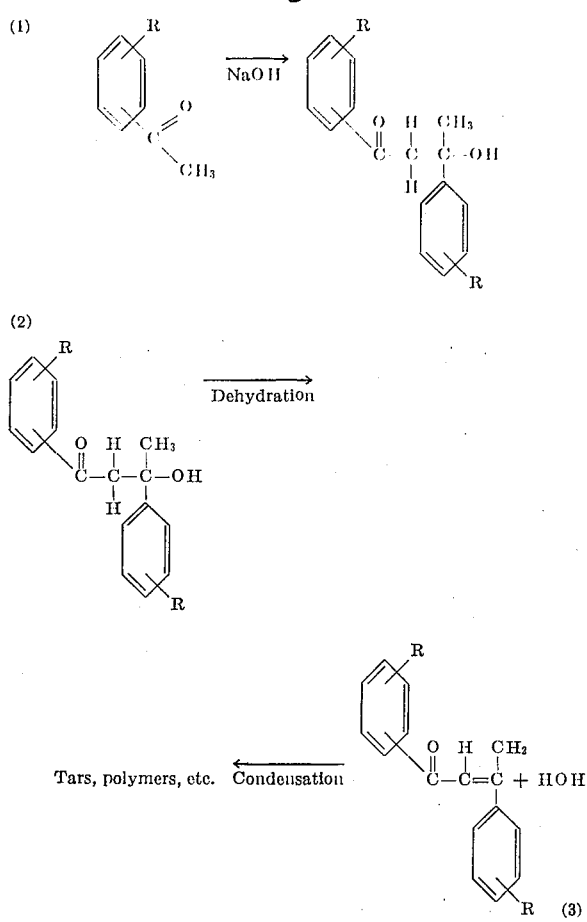

The unsaturated ketones so obtained are highly reactive and would be expected to lead to further condensations or reactions with oxygen to form undesirable polymeric products. Thus, one would be led to expect lower yields of desired product, greater purification problems and substantial formation of undesirable side products. Yet it has been found that the alkoylbenzoic acid need not be separated from the alkylbenzoic acid prior to conversion of the latter to its corresponding hydroperoxide and that good yields of hydroxybenzoic acid are still obtained. In addition, since alkoylbenzoic acid is produced in the first oxidation stage as well as in the decomposition stage, its removal from the system in a single operation at the end of the process effects additional savings.

The process can further be illustrated by the following examples.

EXAMPLE I

Into a 1-litter, 316-stainless steel, magnetically stirred autoclave there was placed 53 grams of para-cymene, 20 grams of methyl ethyl ketone, 400 grams of acetic acid, 20 grams of cobaltous acetate tetrahydrate (1.2 percent by weight, as cobalt, based on the acetic acid) and 70 grams of normal butane. While the mixture was vigorously stirred, the unit was pressured with oxygen to about 150 to 200 pounds per square inch gauge and heat was then applied thereto. When the temperature of the reaction mixture reached 105° C., oxygen was added to the autoclave to raise the pressure to 320 pounds per square inch gauge. This pressure was maintained throughout the reaction. After an induction period of 60 minutes the reaction began as evidenced by continuous oxygen absorption. After a reaction time of 1.5 hours at 105° C. the reaction was terminated, the autoclave was cooled to room temperature and depressured through a series of cold traps to remove unreacted normal butane. The contents of the autoclave were drained and most of the acetic acid solvent was removed under reduced pressure. About 500 cubic centimeters of ice water was added to the residue to cause a white solid acid to precipitate out of solution. The acid product was filtered, washed with water several times and dried in an oven to give 64.9 grams of product. The latter was analyzed by infrared and nuclear magnetic resonance spectroscopy, gas chromatography, melting point and neutral equivalent and was found to be 90 percent by weight of the desired para-isopropylbenzoic acid and 10 percent para-acetobenzoic acid. Conversion of the para-cymene was complete.

EXAMPLE II

Into a 200-milliliter, three-necked, round-bottomed flask, equipped with a reflux condenser, a thermometer and a sparger, there was placed a mixture, obtained from EXAMPLE I, containing 17.9 grams of para-isopropylbenzoic acid, 2.1 grams of para-aceto-benzoic acid, 0.01 gram of benzoyl peroxide and enough 1.2 N sodium hydroxide to obtain a resulting mixture having a pH of about 9.5. While the mixture was maintained at a temperature of 90° to 95° C. and atmospheric pressure, and over a period of 50 hours, a continuous stream of air at the rate of between 30 and 50 cubic centimeters per minute was passed therethrough. When the reaction was stopped, 21.5 percent of the para-isopropylbenzoic acid was converted to para-isopropylbenzoic acid hydroperoxide.

To a 500-milliliter flask equipped with a stirrer, a dropping funnel and a reflux condenser, there was added 100 cubic centimeters of water and 20 grams of concentrated sulfuric acid. The mixture was warmed to 80° C. and then the aqueous hydroperoxide solution obtained above was added slowly thereto over a period of about 1 hour. The resulting solution was filtered while hot to remove an oily layer therefrom, which was mostly unreacted paraisopropylbenzoic acid. Cooling the filtrate to 0° C. resulted in the precipitation of para-hydroxybenzoic acid. Analysis by gas chromatography disclosed the production of 1.6 grams (50 percent efficiency) of para-hydroxybenzoic acid and 0.4 gram (10 percent efficiency) to para-acetobenzoic acid. Since 2.1 grams of para-acetobenzoic acid were present in the charge, the total amount of para-acetobenzoic acid in the final product was 2.5 grams.

EXAMPLE III

The run of EXAMPLE II was repeatd except that 14 grams of para-isopropylbenzoic acid and 93 cubic centimeters of 0.967 N sodium hydroxide was used and no para-acetobenzoic acid was present. When the oxidation was terminated, 24 percent of the para-isopro-pylbenzoic acid was converted to para-isopropylbenzoic acid hydroperoxide. The hydroperoxide solution was also treated as in EXAMPLE II. Analysis disclosed the production of 1.9 grams (62 percent efficiency) of para-hydroxybenzoic acid an 0.5 gram (15 percent efficiency) of para-acetobenzoic acid. In neither of EXAMPLES II nor III was a quantitative analysis made for acetone. In EXAMPLES II and III the grams of para-acetobenzoic acid produced per 100 grams of para-isopropylbenzoic acid treated was 2.2 and 3.6, respectively.

From a study of the above examples, it can be seen that, unexpectedly, the presence of the by-product para-acetobenzoic acid in the first stage oxidation did not seriously effect the course of the reaction defined and claimed herein, for almost as much para-hydroxybenzoic acid was obtained in EXAMPLE II as in EXAMPLE III. Also unexpectedly, less para-acetobenzoic acid was formed in EXAMPLE II than in EXAMPLE III.

Obviously, many modifications and variations of the invention, as hereinabove set forth, can be made without departing from the spirit and scope thereof, and therefore only such limitations should be imposed as are indicated in the appended claims.

We claim:

1. A process for converting a benzenoid structure carrying a nuclear methyl substituent and a higher alkyl substituent, werein the carbon attached to the benzenoid structure carries secondary or tertiary hydrogens, to a hydroxy-benzoic acid which involves heating the benzenoid structure with oxygen in the presence of cobaltic ions dissolved in a lower carboxylic acid solvent to selectively convert the methyl substituent on the benzenoid compound to a carboxylic acid group and to obtain some alkoylbenzoic acid, heating the total reaction product containing the benzenoid compound in a basic system with molecular oxygen to convert the higher alkyl substituent to the corresponding hydroperoxide and thereafter decomposing the benzenoid compound to hydroxybenzoic acid and ketone in the presence of a strongly acidic material.

2. The process of claim 1 wherein the amount of cobalt is at least about 0.1 percent by weight based on the lower carboxylic acid solvent.

3. The process of claim 1 wherein the amount of cobalt is from about 1 to about 5 percent by weight based on the lower carboxylic acid solvent.

4. The process of claim 1 wherein the initial heating is in the range of about 50° to about 200° C.

5. The process of claim 1 wherein the lower carboxylic acid is acetic acid.

6. The process of claim 1 wherein said higher alkyl substituent is isopropyl.

7. The process of claim 1 wherein the benzenoid structure is para-cymene.

8. The process of claim 1 wherein the hydroperoxide is obtained at a temperature of about 50° to about 140° C.

9. The process of claim 1 wherein the hydroperoxide is obtained in the presence of a free-radical agent.

10. The process of calim 9 wherein the free-radical agent is benzoyl peroxide.

11. The process of claim 1 wherein the decomposition is carried out at a temperature of about 20° to about 100° C.

12. The process of claim 1 wherein the decomposition is effected in the presence of sulfuric acid.

* * * * *